March 18, 1952  G. D. SHAEFFER  2,589,877
HYDRAULIC POWER CONTROL
Filed June 27, 1946  4 Sheets-Sheet 4
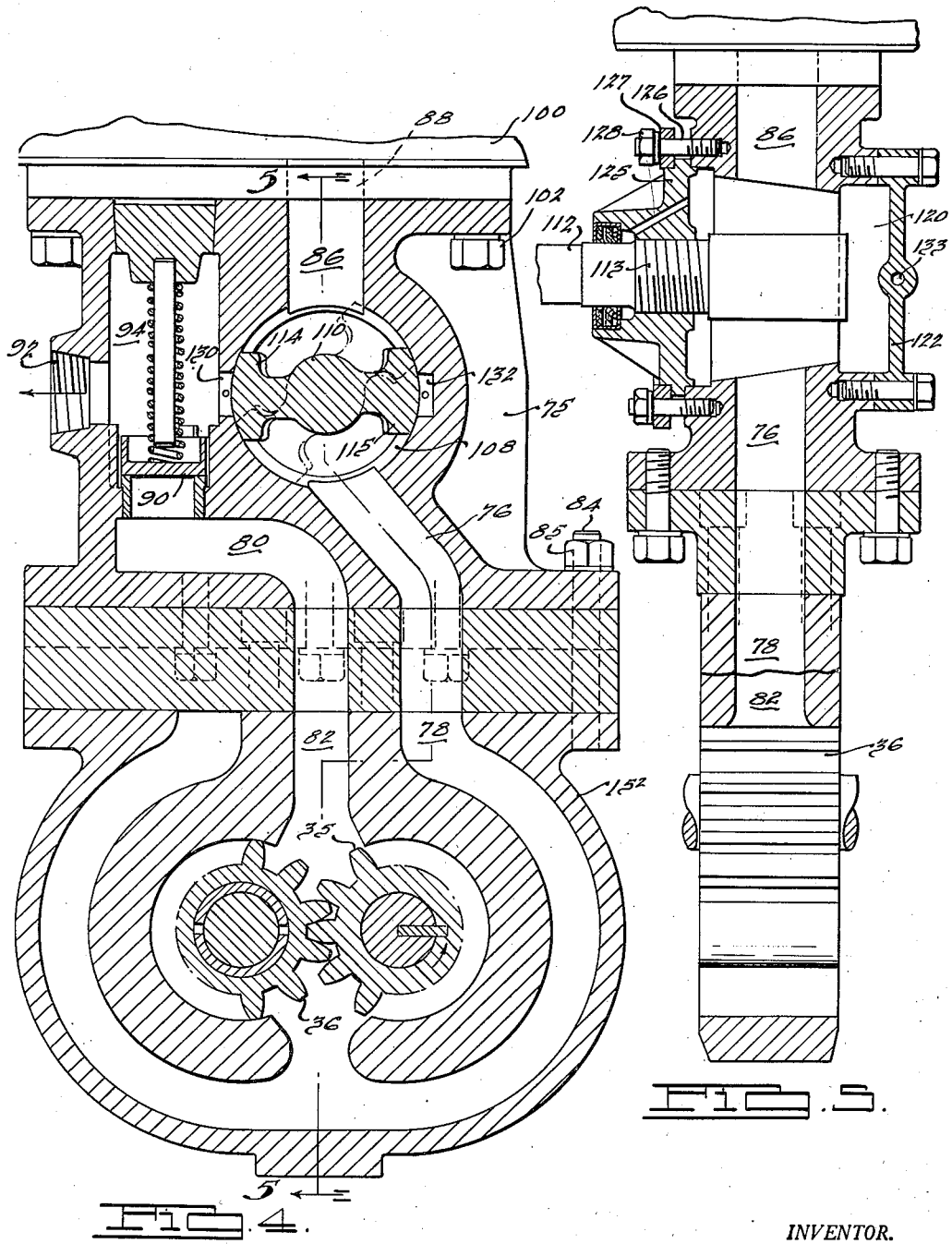
INVENTOR.
George D. Shaeffer.
BY
ATTORNEYS.

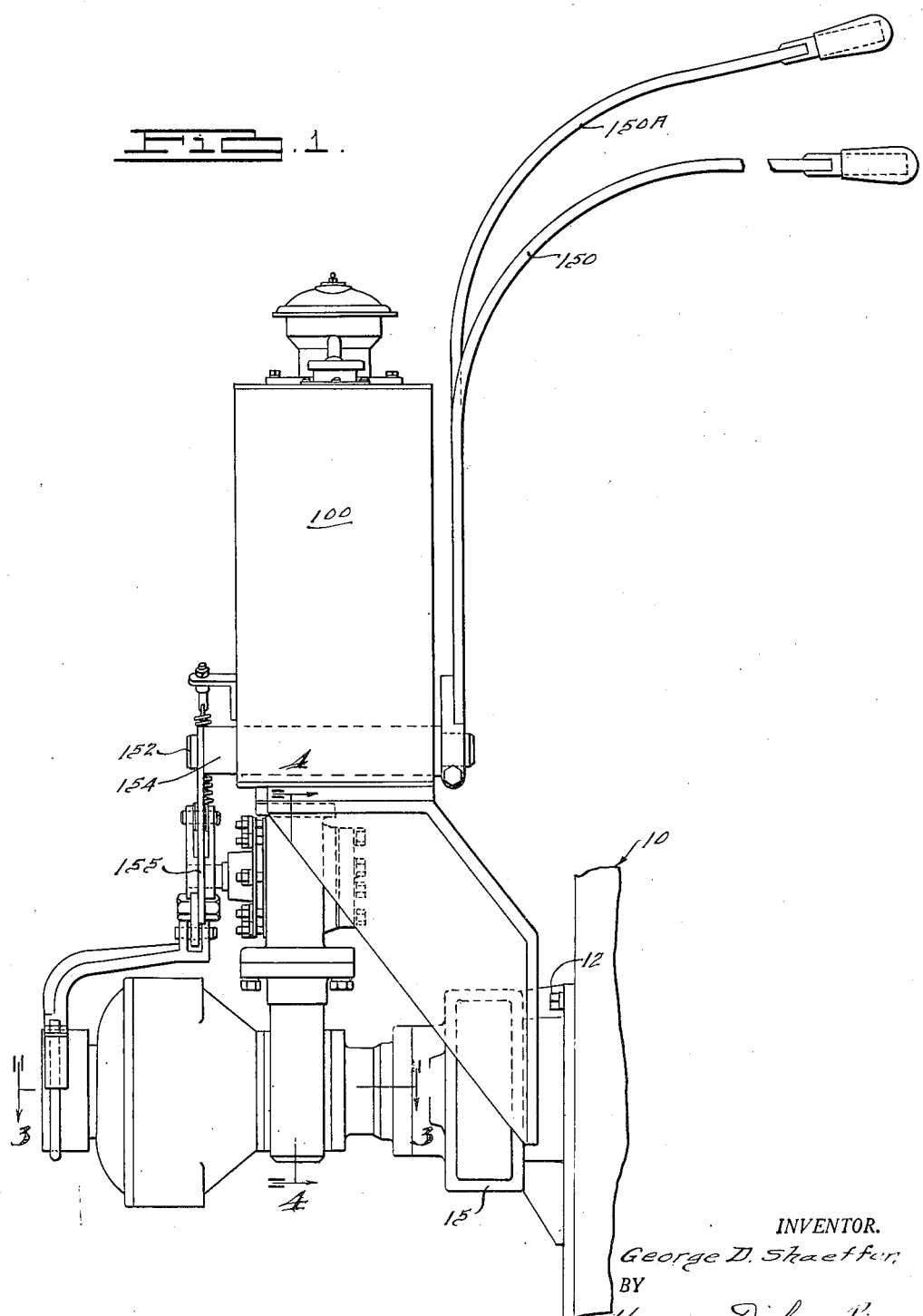

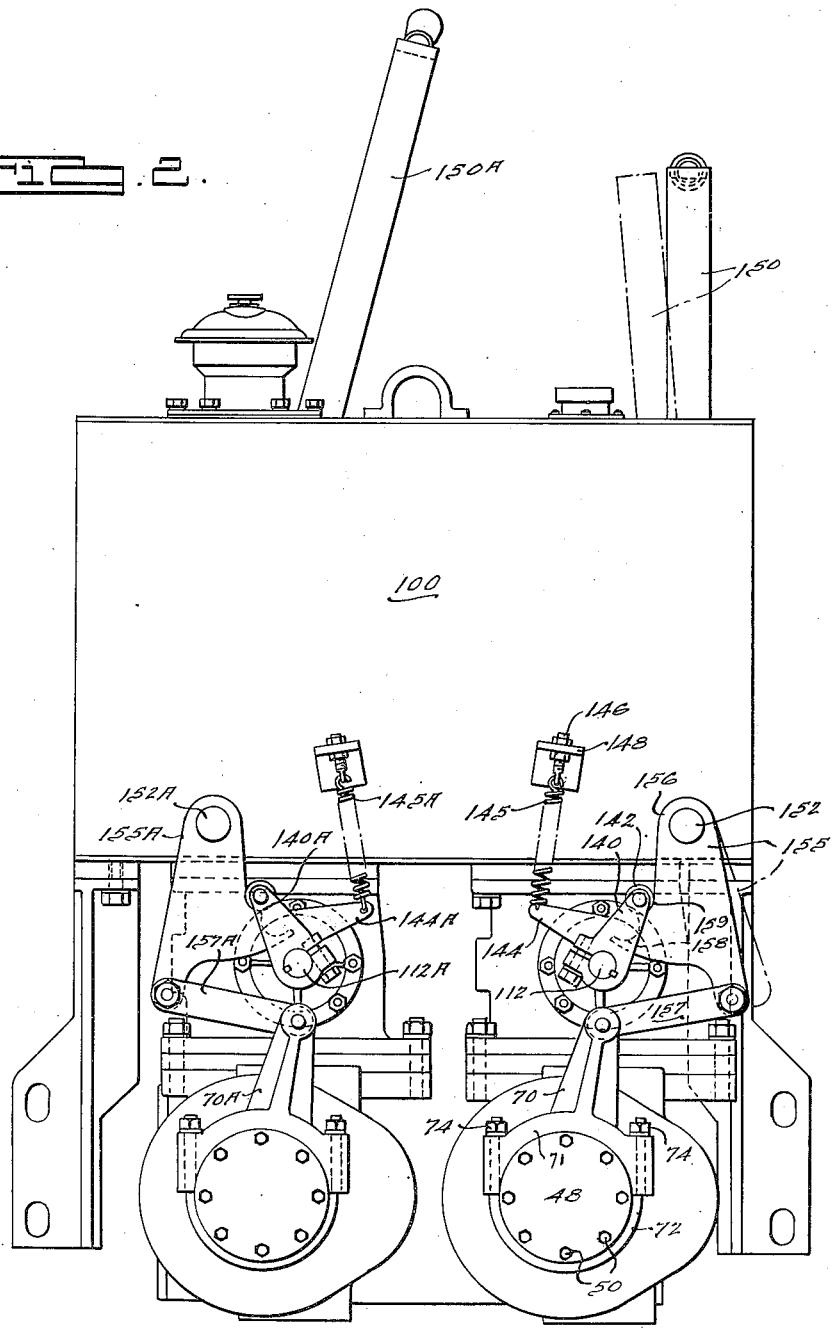

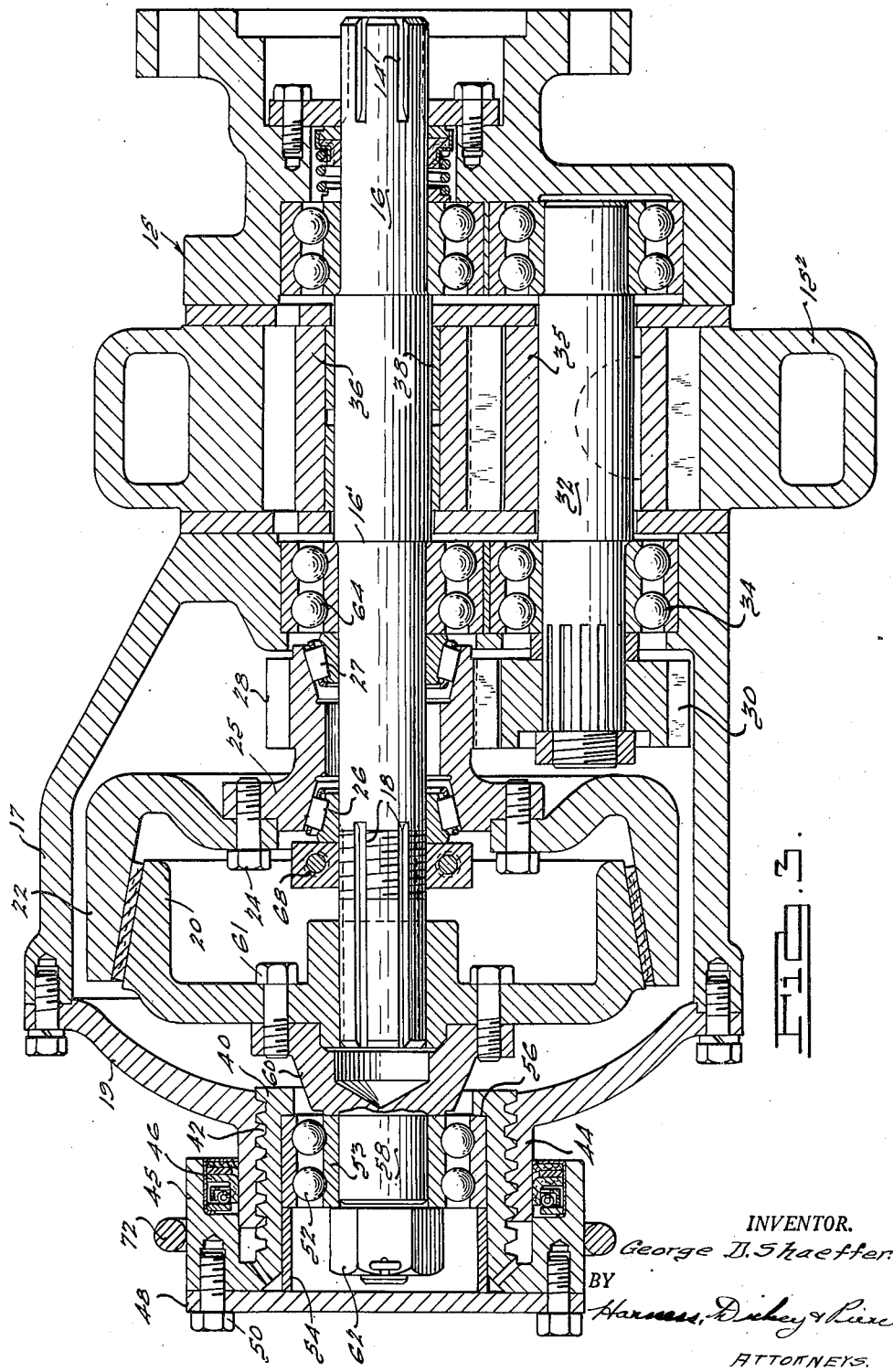

Patented Mar. 18, 1952

2,589,877

UNITED STATES PATENT OFFICE 2,589,877

HYDRAULIC POWER CONTROL

George D. Shaeffer, Detroit, Mich., assignor to Gar Wood Industries, Inc., Detroit, Mich., a corporation of Michigan Application June 27, 1946, Serial No. 679,668

4 Claims. (Cl. 103—23)

This invention relates to hydraulic power generating and control devices.

The main objects of this invention are to provide an improved hydraulic power generating and control system so arranged that a flow of fluid under pressure may be established and interrupted at will to actuate desired apparatus, the arrangement being such that when the flow of fluid under pressure is interrupted at the power control means, the pressure in the delivery line to the controlled apparatus may be maintained, so that hydrostatic pressure in such delivery line may be effective to maintain the controlled apparatus in a desired position even though the pressure generating means or pump and all of the remaining apparatus be inactive; to provide in such apparatus a novel arrangement wherein a single simple control lever is utilized to control the delivery of fluid to the controlled apparatus, as by making and breaking a driving connection to the pressure-generating pump, and to include means whereby the same lever also actuates, through interconnecting means constructed and arranged in a novel manner, a control valve mechanism which permits the pressure in the delivery line to the controlled apparatus to be held or relieved at will by moving the control lever in one direction while the valve remains stationary in one position to cause delivery of fluid to the pump and from the pump to the controlled apparatus, while clutching means is engaged to drive the pump and resultantly energize the controlled apparatus, or by alternatively moving the control lever in a reverse direction to disengage the clutch, stop the pump and hold the valve in a position serving to trap the fluid in the delivery line and maintain the hydrostatic pressure therein, in the manner above-mentioned. The last mentioned condition may be maintained for as long as desired, although if movement of the control handle be continued in the same direction, the pump drive remains disconnected while the valve is moved to a venting position, relieving the aforementioned hydrostatic pressure and permitting the controlled apparatus to assume a relaxed position, as by falling under gravity, and/or spring effect, in accordance with the particular engineering details of design of the controlled apparatus.

An object related to that last stated is to provide improved hydraulic power control means wherein a single operating handle or lever may be utilized to control hydraulically actuable apparatus in the indicated manner and wherein the arrangement is such as to conform to operating lever motions and positions which have become standardized in certain types of ground-working machines, such as scrapers, particularly scrapers of the class operated and controlled by cable-delivered power. Thus, an operator familiar with the handling of such cable-controlled power units may operate my improved hydraulic-type control unit without special training, and may change from the operation of one type of apparatus to another without confusion and resultant inefficiency.

Another object is to provide such a control unit in which a single operating lever may be moved continuously in one direction, first to close off the venting connection to the delivery conduit and then to actuate the pump and initiate delivery of fluid under pressure to the controlled unit.

Other objects and advantages of the invention will become apparent upon consideration of the remaining portions of this disclosure.

An illustrative embodiment of my invention in a preferred form is shown in the accompanying drawings, in which Figure 1 is a side elevational view of a dual power control unit constructed in accordance with the present invention, showing the same mounted upon a tractor, which is fragmentarily illustrated as typifying a suitable source of power and which may, of course, also serve as motivating means for the controlled apparatus;

Figure 2 is a rear elevational view of the control unit;

Figures 3 and 4 are sectional views taken substantially on the lines 3—3 and 4—4, respectively, of Figure 1, and looking in the direction of the arrows; and Figure 5 is a vertical sectional view taken substantially on the line 5—5 of Figure 4, and looking in the direction of the arrows.

Referring now to the drawings, reference character 10 designates generally a tractor, which is fragmentarily illustrated as representative of a prime mover adapted to serve as a source of power for the hydraulic system forming the subject matter of the present invention and which may also be used to draw the controlled apparatus, although it will be apparent that this is subject to variation and that the details of construction of such parts form no part of my present invention. A hydraulic pump and controlling clutch assembly, the casing of which is generally designated 15, is connected to the rear end of the tractor, to which it is shown attached by means of cap screws 12. This assembly preferably corresponds to that disclosed in my copending application, Serial No. 488,023, filed May 22, 1943, and entitled, "Clutch Driven Hydraulic Pump," which matured into Patent No. 2,413,081 on December 24, 1946. The general construction and arrangement of the assembly is shown in Figure 3, although it will be understood that a power take-off shaft (unshown) carried and driven by the prime mover of the tractor is connected to the driven shaft 16 as by coupling means including the splined portion 14. Shaft 16 is axially mounted within the casing structure 15 of the unit and carries splined or otherwise fixedly attached to its rear extremity, within the enlarged casing portion 17, the driving cone member 20 of a cone clutch assembly, the driven member of which comprises a drum 22 provided with a conformably tapered inner surface and secured, as by screws 24, to a hub 25 freely rotatable upon the shaft 16, as upon the tapered roller bearings 26 and 27. A driving pinion 28 integral with hub 25 meshes with a pinion 30 carried by countershaft 32 longitudinally journaled as in ball bearings 34 in the casing structure 15 in spaced parallel relation to the main shaft 16. Fast upon the countershaft 32 is the driving gear 35 of a gear pump, the driven gear 36 of which is freely rotatable upon the shaft 16 as upon the sleeve bearing 38. The driver 20 of the clutch is longitudinally slidable along the splined extremity 18 of the shaft 16, as by means of a screw-type actuator 40 having external threads meshing with conformable helical threads 42 formed in the rearwardly projecting collar portion 44 of the end bell or closure portion 19 of the casing assembly. A sleeve portion 45, welded or otherwise rigidly connected to the actuator portion 40 and concentrically spaced outwardly from the same, slidably encircles the smooth cylindrical exterior of the collar portion 44 and is provided with a suitable packing gland, as 46, bearing against the surface of the collar. The clutch actuator is closed at its outer end by a plate 48 tightly held in sealed engagement therewith by screws 50. The plate 48 retains the clutch throw-out bearing assembly 52, shown as of the double ball type, which is located between a spacer 54 interposed between the plate and the bearing and a shoulder 56 formed by an inwardly directed flange integral with the inner end of the actuator 40.

The inner race 53 of the clutch throw-out bearing is fitted upon a stub shaft 58 integral with a hub extension 60 projecting axially from the driving cone 20 of the clutch assembly. The extension 60 is attached by means of screws 61 to the outer face of the web of the driving cone, the cone being positioned with respect to the bearing assembly 52 and actuator 40 by a nut 62 threaded upon the end of the stub shaft portion 58 and overlying the inner bearing race 53.

The driven drum 22 of the clutch is positioned by means of a lock nut 68 mounted upon a threaded portion of the shaft 16 near its rear extremity and bearing against the inner race of the tapered roller bearing 26 and the hub 25 and bearings 26 and 27 being thereby located against the inner race of the main shaft-supporting center ball bearing 64, which, in turn, bears against a shouldered portion 16' of the shaft 16.

The actuator 40 is adapted to be turned, to move the clutch driving cone 20 to and from driving engagement with respect to the driven drum 22, by means of a lever 70 having a yoke portion 71 at its inner end adapted to embrace a part of the sleeve portion 45 of the actuator assembly, to which it is secured as by means of the U-bolt 72 and nuts 74.

It will be seen that when the clutch is engaged, the pump is driven from the shaft through the clutch portions 20, 22 and pinions 28, 30 to the countershaft 32, which turns the pump driving gear 35.

The clutch pump unit has been described only to the extent necessary for a full comprehension of the present invention, since its details are fully disclosed in my copending application abovementioned. Shaft 16 is adapted to be driven constantly by the tractor engine during operation of the system.

A valve casing 75 is secured to the top of the pump section $15^2$ of the clutch pump unit casing assembly and is provided with a fluid passage 76 communicating with the pump inlet fluid passage 78, the passages 76, 78 registering with one another when the casing portions are assembled, in the manner shown in Figures 1, 4 and 5. Another fluid passage 80 in the valve body 75 communicates with the pump outlet passage 82 formed in the pump casing portion $15^2$. The parts are held together in tightly sealed relation as by means of studs 84 and nuts 85 with the passages 76, 78 and 80, 82 in communicating registry, as clearly shown in Figure 4. The valve construction preferably corresponds to that disclosed in my copending application, Serial No. 643,621, filed January 26, 1946, entitled, "Valve," and will, accordingly, be described herein only to the extent necessary for a full comprehension of the present invention. Passage 76 constitutes the outlet passage from the valve and leads, as above-mentioned, to the inlet passage of the pump, while a passage 86 in the valve casing extending downwardly from its top to the valve chamber 108 constitutes the fluid inlet from the reservoir or tank 100 which may be mounted directly upon the top of the valve casing, as by means of the cap screws 102.

The valve inlet passage is open at its upper end and communicates with an outlet opening 88 formed in the bottom of the tank. Passages 86, 76 are normally in constant communication to permit fluid to be pumped from the reservoir to outlet 80 and through a check valve 90 to the outlet coupling portion 92, which is adapted to be connected by suitable conduit means or the like (not shown) to the controlled apparatus. The passages 86, 76 communicate with the upper and lower portions, respectively, of a frusto-conic valve chamber 108 within which is disposed a rotary plug-type valve 110 accurately fitting the chamber and rotatable therein by means of a shaft 112, shown as formed integrally with the valve body. The valving portions 114, 115 of the valve are diametrically opposed, and the valve body is cut away to relatively flat configuration. At its rear end, the valve chamber 108 is in open communication with a chamber 120 closed by a back plate 122 and extending entirely across the rear of the valve chamber, from which it is spaced to form the chamber 120, which provides a passage through which constant communication is afforded between the passages 86, 76 with the valve in either of the positions shown in Figure 4. An intermediate portion 113 of the stem of the valve, between the valve body and its actuating shaft portion 112, is threadedly engaged with a conformably internally threaded opening in the valve supporting plate 125 which is secured to the face of the valve casing 75 and closes the front of the valve chamber 108. Plate 125 is normally held against turning by friction clamping means comprising studs 126, clamping ring 127 mounted upon the studs, and nuts 128 which normally force the ring against an outer portion of the plate 125. When the nuts are loosened, the plate may be turned to adjust the same so that the peripheral surfaces of the valving sections 114, 115 of the plug will seat tightly against the complementary conic portions of the valve chamber 108 when the valve reaches the closed position shown in Figure 4, the valve moving axially rearwardly into such seating engagement with the walls of the chamber as it is moved from the open position shown in dot-dash lines in Figure 4 to the closed position shown in full lines in that view, under the influence of the threaded portions 113. Even though the valve is firmly seated in the closed position in the indicated manner, it is drawn outwardly away from its seated engagement with the tapered chamber as opening movement commences, so that it is very easily operable even though tightly wedged in the closed position.

The outlet check valve 90 is vertically slidable in the lower portion of a chamber 94 which communicates with the outlet coupling portion 92 and with a return passage 130 which opens into the side of the valve chamber 108 in such position that it is tightly sealed off by the valve portion 114 when the valve is in the closed position. A port 132 of corresponding size and arrangement is formed in the diametrically opposite side of the valve chamber to port 130, in position to be sealed off by the valve portion 115, and communicates with the port 130 through pressure equalizing passages, as 133. This arrangement will be seen to equalize the lateral pressure exerted upon the valve plug by fluid trapped under hydrostatic head in the outlet system.

When the valve is thrown to the position shown in dot-dash lines in Figure 4, communication is established between passage 130 and the reservoir, so that even if the pump continues to run, pressure cannot be built up in the chamber 94 and in the supply system to the controlled apparatus. My preferred controlling apparatus is preferably so arranged, however, that the pump cannot be operated with the valve in the venting position shown in dot-dash lines in Figure 4, while with the valve in the full line position, the pump may be started and stopped at will Fast upon the outer end of the valve actuating shaft portion 112 is a valve actuating lever 140 carrying upon its end a roller 142 and also provided with a laterally extending arm 144 to which a biasing spring 145 is connected, the other end of the spring, which is of the helical tension type, being connected by means of an adjusting screw 146 to bracket 148 attached to the rear face of the tank 100. The spring yieldably urges the valve toward and normally maintains it in the position shown in full lines in Figure 4.

A main control lever 150 is fast upon and carried by the forward end of a rockshaft 152 journaled in a tube 154 which extends through the tank 100, the tube being sealed with respect to the tank, as by welding, so that the lever 150 may conveniently be mounted upon the forward extremity of the shaft 152, which projects from the tank and the sleeve, while the rear extremity of the shaft, which also projects from the tank and the sleeve, carries a sector plate 155 fast upon the shaft and articulated to the clutch actuating lever 70 by a link 157. An edge 156 of the sector plate moves in coplanar relationship with respect to the roller 142 and is provided with rounded depressions, as 158, 159, engageable with the roller and so contoured that the roller may be actuated with a snap-action from one to the other of the depressions, while the motion thus imparted to the lever 140 is sufficient to throw the valve from one to the other of the two positions shown in Figure 4. When the roller 142 is engaged with the notch 158, the valve is in the position shown in dot-dash line in Figure 4, while when the sector plate 155 is rocked counterclockwise to the full line position of Fig. 2, so as to permit the lever 140 to swing to the position in which roller 142 is in, or is in the path of, the notch 159, the valve assumes the seated, full line pressure maintaining position of Figure 4 under the influence of spring 145. The arrangement of the clutch actuating portions 40, etc., previously described, is such that the clutch is disengaged and the pump accordingly inoperative when the sector plate 155 and its actuating lever are in the positions shown in full lines in Figure 2, while when the lever 150 and sector plate 155 are moved clockwise to rock the levers 70 and 140 counterclockwise, as viewed in Fig. 2, the clutch remains disengaged (cone 20 merely being pulled farther from drum 22). The roller 142 is at the same time brought into the notch 158 and the valve turned to vent the fluid supply system to the controlled apparatus.

The clutch is engaged by rocking the lever 150 in the opposite direction, so that it and the sector plate assume the positions shown in dot-dash lines in Figure 2, and it will be seen that this does not occur until after the valve has reassumed the full line positioning of Figure 4. Thus, pressure may be applied to the controlled apparatus at will, intermittently or otherwise, by rocking the lever 150 and sector plate 155 between the two positions illustrated in Figure 2, while when the pump is disconnected, by rocking these parts to the full line position of Figure 2, the escape port 130 remains closed, trapping the fluid in the supply system to the controlled apparatus and maintaining such apparatus in the position to which it has been actuated. When it is desired to relieve the pressure in the supply system to the controlled apparatus so as to permit such apparatus to reassume a relaxed or initial positioning, it is only necessary to rock the lever and sector plate in the opposite direction to turn the valve to the position indicated in dot-dash lines in Figure 4 (the pump remaining inoperative), whereupon the pressure in the supply line is vented to the tank in the manner disclosed above.

Although the description has been confined to a single control system and clutch pump unit, these assemblies may, of course, be used in multiples, and the drawings show a dual installation in which two complete systems are supplied from a single tank 100. Parts of the second control system corresponding to those already described are designated by like reference characters distinguished by the addition of the letter "A" to each. It will be seen that no detailed redescription of the parts duplicated in the second assembly will be required. It will also be apparent that this and other features may be varied without departure from the spirit or scope of the subjoined claims.

I claim:

1. Control means for a fluid pumping and supply system comprising in combination with a pump for delivering fluid under pressure, a clutch for making and breaking a driving connection between said pump and a source of power, and a control valve for controlling the flow of the pumped fluid, a clutch actuating element movable to engage and disengage the clutch, a valve actuating element movable to actuate the valve, a spring biasing the valve to one position, a common control member for said elements limitedly movable independently of said valve actuating element and operatively connected to the clutch actuating element to actuate the same, and the clutch, only during such independent movement.

2. Control means for a fluid pumping and supply system comprising in combination with a pump for delivering fluid under pressure, a clutch for making and breaking a driving connection between said pump and a source of power, and a control valve for controlling the flow of the pumped fluid, a clutch actuating element movable to engage and disengage the clutch, a valve actuating element movable to actuate the valve, a spring biasing the valve to one position, a common control member for said elements limitedly movable independently of said valve actuating element and operatively connected to the clutch actuating element to actuate the same, and the clutch, only during such independent movement, the control member having a one-way driving connection with the valve actuating element and a two-way driving connection with the clutch actuating element, a check valve located between the pump and the control valve to prevent back flow toward the pump, said control valve comprising a dumping valve openable to relieve the output pressure and closable to maintain such pressure, said spring means biasing the control valve toward closed position and in the opposite direction to that in which it may be moved by the control member.

3. Control means for a fluid pumping and supply system comprising in combination with a pump for delivering fluid under pressure, a clutch for making and breaking a driving connection between said pump and a source of power, and a control valve for controlling the flow of the pumped fluid, a clutch actuating element movable to engage and disengage the clutch, a valve actuating element movable to actuate the valve, a spring biasing the valve to one position, a common control member for said elements limitedly movable independently of said valve actuating element and operatively connected to the clutch actuating element to actuate the same, and the clutch, only during such independent movement, the control member having a one-way driving connection with the valve actuating element and a two-way driving connection with the clutch actuating element, a check valve located between the pump and the control valve to prevent back flow toward the pump, said control valve comprising a dumping valve openable to relieve the output pressure and closable to maintain such pressure, and spring means biasing the control valve toward closed position and in the opposite direction to that in which it may be moved by the control member, said clutch actuating element having at one end of its effective travel a clutch-engaged position, at an intermediate point a clutch-disengaged valve-closed position, and at another end of its travel a valve-open position wherein the clutch remains disengaged.

4. In a fluid power control, the combination of a pump for delivering fluid under pressure, means including a clutchable element for making and breaking a driving connection between said pump and a source of power, a valving element communicating with the output of the pump for controlling the flow of the pumped fluid, common control means for actuating said clutchable element and valving element including an actuating member selectively operatively interconnectable with the clutchable element and with the valving element and movable in a path which contains two spaced positions, in one of which positions it actuates the clutchable element to engaged position and in another of which it opens the valving element to relieve the pressure of pumped fluid, said actuating member being movable independently of the valving element during actuation of the clutchable element and means for biasing the valving element to stand in a closed, pressure-maintaining position during such independent movement of the actuating member.

GEORGE D. SHAEFFER.

REFERENCES CITED

The following references are of record in the file of this patent:

UNITED STATES PATENTS

| Number | Name | Date |
|---|---|---|
| 1,223,741 | Schwister | Apr. 24, 1917 |
| 1,251,399 | Mayer, et al. | Dec. 25, 1917 |
| 1,531,985 | Schneiter | Mar. 31, 1925 |
| 1,788,027 | May | Jan. 6, 1931 |
| 1,908,614 | Maloon | May 9, 1933 |
| 1,971,651 | Gorsuch, et al. | Aug. 28, 1934 |
| 2,361,086 | Carlson | Oct. 24, 1944 |
| 2,413,081 | Shaeffer | Dec. 24, 1946 |